July 4, 1967 R. D. PAGE ETAL 3,328,905
CORRELATING CONTROL FOR VEHICLE MOUNTED TOOL
Filed Sept. 17, 1964
2 Sheets-Sheet 1

INVENTORS
RUSSELL D. PAGE
WILLIAM W. BREITBARTH
BY
Fryer and Tjensvold
ATTORNEYS

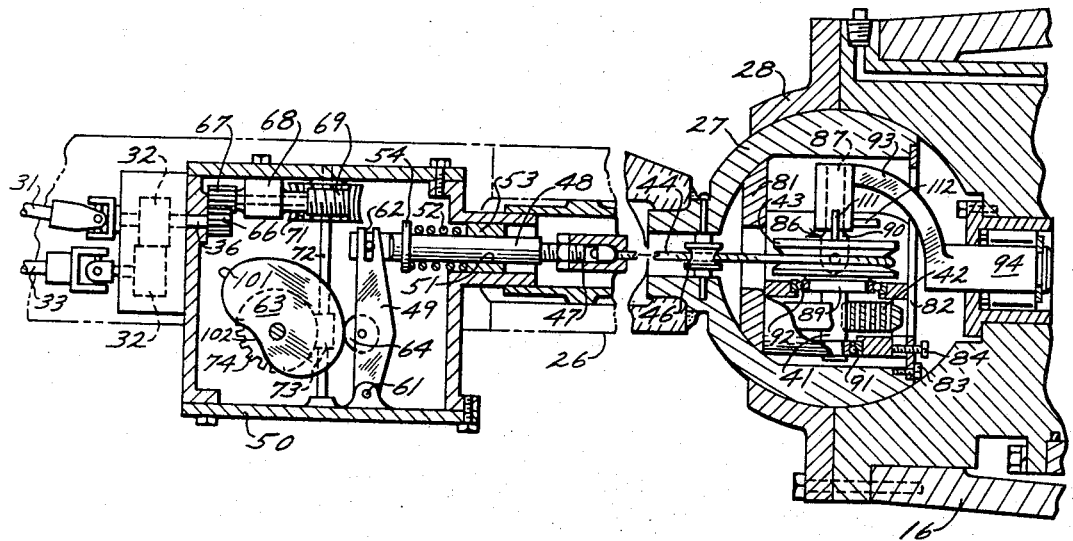
Fig-2-

3,328,905
CORRELATING CONTROL FOR VEHICLE
MOUNTED TOOL
Russell D. Page, Decatur, and William W. Breitbarth, Metamora, Ill., assignors to Caterpillar Tractor Co., Peoria, Ill., a corporation of California
Filed Sept. 17, 1964, Ser. No. 397,146
7 Claims. (Cl. 37—156)

ABSTRACT OF THE DISCLOSURE

Apparatus maintaining angular correlation between an angularly movable member and a remotely located simulator wherein the simulator is mounted for angular movement about an axis and is urged to move in one direction by a fixed force-producing means such as a spring which is counterbalanced by a second force-producing means such as a cable wherein the counter force produced by the second force-producing means is a function of the angular position of the member whereby angular movement of the member produces angular movement of the simulator.

---

The present invention relates to automatic blade controls and more particularly to controls for maintaining angular correlation between an earth working blade, such as those found on motor graders, and a resolver, forming part of an automatic blade control system.

Those familiar with the activities of the earth moving industry in general and road grading in particular are keenly aware of the high accuracy performance demanded of the present day motor grader. Accuracies of ⅛ of an inch in 10 feet are not uncommon to work performed by motor graders. In order to obtain accuracies of this nature it is necessary for a motor grader operator to make several passes over the same terrain and each pass must be made at a speed slow enough to enable the operator to compensate for ground irregularities which change the relative slope of the blade. Since the amount of finished grading which can be done by a motor grader in a given period of time is a factor which contributes significantly to the cost of performing a grading contract, the industry has long searched for an addition to the conventional motor grader which can aid the motor grader operator in maintaining a desired blade slope.

A problem which has provided a great deal of difficulty in this field is the simulation of the slope of the motor grader blade. At the heart of every motor grader blade control system is a blade slope simulator which induces a signal when the slope of the blade deviates from a preselected blade slope. A problem occurs in constantly changing the disposition of the blade slope simulator to accurately reflect changes in the blade itself. The slope of the actual working blade is a function of the blade incline (measured by the deviation of the blade support circle from a horizontal plane measured along the longitudinal axis), of blade angle (measured by the angular deviation of the blade from a plane transverse to the longitudinal axis of the motor grader), as well as the slope of the blade support circle (measured by the angle of the blade support circle from a horizontal plane where the angle is taken along a transverse axis). A change in any of the variables set out above can result in a change in the blade slope which must be reflected in the blade slope simulator if completely accurate correspondence between the simulator and the blade is to be maintained.

A blade slope simulator of unique design giving rise to many advantageous features is set forth in detail in assignee's copending application Ser. No. 351,020 of William W. Breitbarth et al., filed Mar. 11, 1964. This copending patent application teaches a blade slope simulator advantageously disposed within the drawbar ball which forms an articulate connection between the drawbar and bolster of the motor grader. Being mounted within the drawbar ball the simulator automatically reflects changes in the blade incline, and changes in the slope of the blade support circle. The present invention is directed to a mechanical system which can be advantageously employed in conjunction with a blade slope simulator disposed in the drawbar ball of a motor grader. The invention is operative to maintain correct correlation between the angle of the blade and the angle of the blade slope simulator. Those blade control systems known in the art which only maintain correlation as to blade incline and the slope of the blade support circle operate inaccurately whenever the blade is at a position other than 90° to the longitudinal axis of the motor grader inasmuch as the amount of slope correction necessary for a given deviation in terrain becomes proportionately less as the blade angle increases.

The unique combination of components taught by the present invention provides a device which correctly correlates the angle of the simulator with the angle of the blade while allowing the earth working blade to continuously rotate. The present invention also operates to preclude the resolver mechanism from becoming angularly oriented within specified angular limits in which the mechanism is vulnerable to damage.

Accordingly, it is an object of the present invention to provide a correlating control for a vehicle mounted tool.

It is a further object of the present invention to provide a mechanical system for maintaining angular correlation between a blade slope simulator and a blade.

A further object of the present invention is to provide an angular correlation mechanism for a blade slope simulator disposed in the ball of a motor grader for automatically controlling the slope of the motor grader blade wherein the blade can be continuously rotated without interfering with the operation of the angular correlation device.

Further and more specific objects and advantages of the present invention are made apparent in the following specification wherein a preferred form of the invention is described by reference to the accompanying drawing.

In the drawing:

FIG. 2 is a sectional side view of a portion of a blade slope simulator together with the angular correlation system taught by the present invention;

Figure 1:
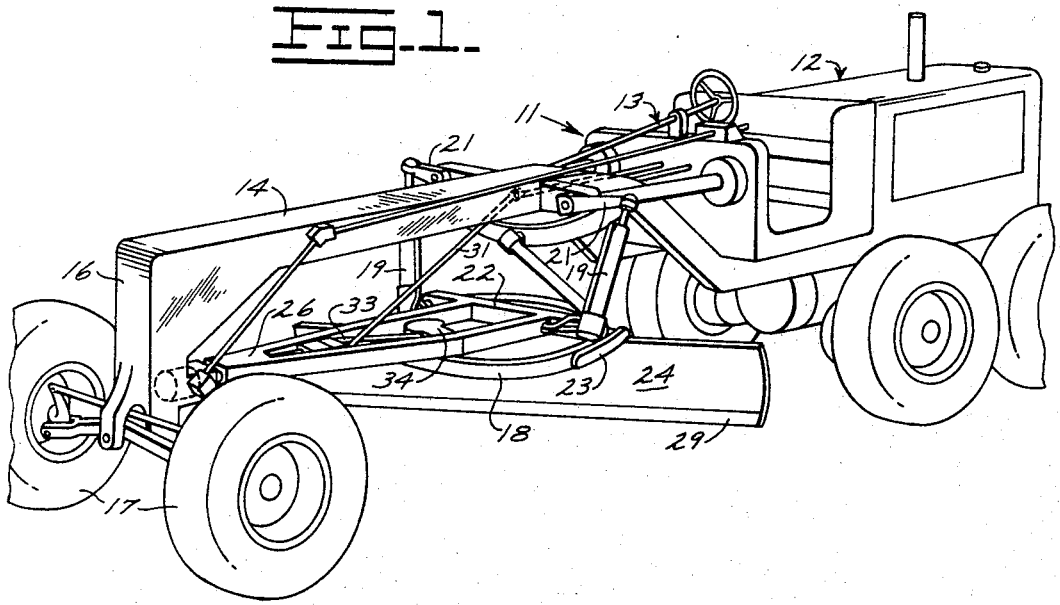
FIG. 1 is an isometric illustration of a motor grader equipped with an automatic blade control system including a correlationg control as taught by the present invention.

Referring now to FIG. 1, a motor grader 11 includes a rear engine portion 12, an operator's control station 13, a main frame 14 extending forwardly from the operator's station, and a bolster 16 integral with the main frame 14 and supported between the front wheels 17. Disposed below the main frame 14 between the bolster 16 and the operator's station 13 is a blade support circle 18 which is secured to the main frame 14 by a pair of lift jacks 19 each of which is attached at one end to a main frame connecting bracket 21 and at the opposite end to a cross bar 22 which is rigidly secured to blade support circle 18 at an orientation which is generally transverse to the main frame 14. Blade support structure 23 associated with the blade support circle 18 serves to mount the motor grader blade 24 to the blade support circle 18.

A drawbar 26 is disposed between the blade support circle 18 and the bolster 16. The drawbar is rigidly connected to the blade support circle 18 at one of its ends and connected at its other end to the bolster 16 by an articulate connection formed by a ball 27 integral with the drawbar 26 and a socket 28 integral with the bolster 16. (See FIG. 2.)

The slope of the blade 24 is defined as the angle which the cutting edge 29 of the blade makes with a horizontal plane. The blade support structure formed by member 23, circle 18 and drawbar 26 has three degrees of freedom; changes in any or all of which can affect the slope of the blade 24. If the hydraulic lift jacks 19 are operated so as to cause a relative displacement between the vertical positions of their respective lower ends (those ends which are connected to the crossbar 22) the slope of the blade circle 18 (measured by the angular deviation of the blade circle 18 from a horizontal plane as measured along the line transverse to the longitudinal axis of the motor grader 11) will be altered. The incline of the circle 18 (measured by the angular deviation of the circle 18 from a horizontal plane, as measured along the line parallel to the longitudinal axis of the motor grader 11) can also be changed by raising or lowering jacks 19. The final degree of freedom which the blade support structure has is supplied by a connection between support member 23 and circle 18 which enables the blade 24 to have its angle changed (wherein the angle is measured by the angular deviation between the blade 26 and a vertical plane transverse to the longitudinal axis of the motor grader 11). The present invention provides a control system by which a blade simulator disposed within the drawbar ball 27 is angularly correlated with the blade 24 so that errors between a desired blade slope and an actual blade slope can be accurately detected and the appropriate changes in the blade slope made to achieve the desired slope as taught in assignee's copending application of William W. Breitbarth et al., Ser. No. 351,020, filed Mar. 11, 1964, and assignee's copending application of Marvin E. Beyers et al., Ser. No. 387,307, filed Aug. 4, 1964. The need for angular correlation between the angle of the blade and the angle of the blade simulator is made necessary by the fact that the amount of blade correction required for a given change in vehicle orientation to maintain the desired slope is a function of the angle of the blade. Thus, where the amount of correction which the automatic blade control system furnishes is determined by the amount of correction required to maintain a blade slope simulator in a desired position then it follows that the blade slope simulator must be at an angle which corresponds to the angle of the blade.

Figure 3:
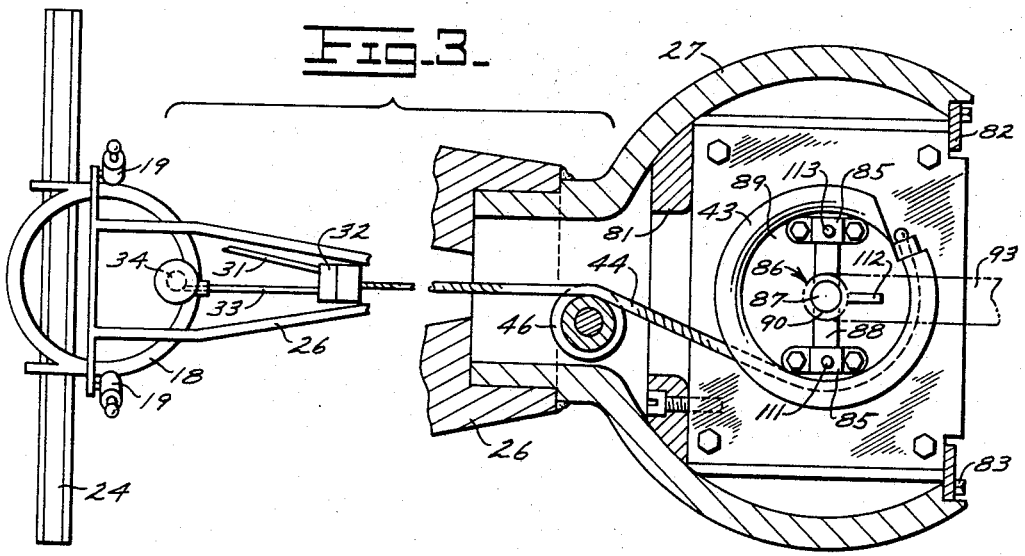
FIG. 3 is a semi-schematic plan view of the present invention in conjunction with a motor grader blade and draw-bar ball including a blade slope simulator disposed within the ball.

Referring now to FIGS. 2 and 3, a housing 81 is secured within ball 27 by a plate 82 which is rigidly secured to the ball 27 as by screws 83. A plurality of screws 84 are provided for vertical adjustment of the housing 81. Disposed within housing 81 is a universal joint 86 which includes a T-bar 90 formed from a vertical member 87 and a horizontal cross member 88, and a support member 89 which is secured to housing 81 and thus fixed relative to ball 27. Member 89 is supported by bearings 91 and 92 making angular rotation about a vertical axis possible. The T-bar 90 is hingedly secured to support member 89 by brackets 85 such that the ball 27 is able to rotate in response to drawbar 26 being raised or lowered. Thus, the T-bar has a rotational degree of freedom about a vertical axis by virtue of the bearing mounting of support member 89 and a further degree of freedom about a horizontal axis through the member 88 by virtue of the hinge connection between the T-bar and the support member 89.

Connected to vertical member 87 is a quadrant 93 which extends forwardly out through the ball 27. The connection between quadrant 93 and vertical member 87 is sufficiently loose to enable the vertical member to rotate about its longitudinal axis without interference from the quadrant. The position of the quadrant member 83 is altered whenever there is a change in the position of the vertical member 87 relative to a true vertical position. In this manner, changes in position of vertical member 87 are transformed into various degrees of rotation of a shaft 94 which is integral with the quadrant 93. As fully described in assignee's copending applications referred to above, the rotation of shaft 94 serves as a means for controlling the position of the blade 24. The amount of vertical deviation of the vertical member 87 from a true vertical position for a given change in the horizontal position of the cross member 88 is a function of the angular position of the cross member 88, as mentioned above. Thus, it is important that the cross member 88 be maintained at an angle which corresponds to the angle of the blade 24 if changes in blade slope are to be accurately compensated for.

Angular adjustment of the blade circle and thus blade 24 is effected through drive shaft 31, gears 32, drive shaft 33 and a bevel drive gear 34 which engages the inner circumference of the support ring 18. Thus, when the operator initially selects the angle of the blade 24 required to perform the particular earth moving job required, he operates the drive shaft 31 from the operator's station 13. In addition to angularly positioning the blade 24, rotation of shaft 31 operates to drive a shaft 36 which serves as a means for inducing a similar change in the angular position of the blade simulator.

The support member 89 of the blade slope simulator includes an integral shaft 41 which is urged in a counter-clockwise direction by a torsion spring 42 which surrounds the shaft and reacts against the stationary plate 82 to which it is secured. A cable 44 is secured at one of its ends to a sheave 43 which is carried by the support member 89 and which surrounds the T-bar 90. Cable 44 which is held fast at its other end prevents the spring 42 from rotating the support member 89 and thus the T-bar 90. By increasing or decreasing the effective length of the cord 44 it is possible to change the angular position of the sheave 43 and thus the angular position of the horizontal member 88 of the T-bar 90.

After leaving sheave 43, cable 44 passes over a roller 46 and is held fast in a toggle 47. The toggle 47 is connected to one end of a connecting rod 48 which in turn connects to a lever 49. The toggle 47 is adjustable in length to provide the system with a means of adjustment to compensate for changes in dimensions and spring forces which occur with time. The rod 48 is slidably disposed within a bore 51, formed by housing 50, and urged leftwardly by a compression spring 52 disposed between the bore forming portion of the housing 53 and a collar 54 located near the end of rod 48 which connects to lever 49. Thus, the force of torsion spring 42 is counteracted by the force of spring 52 as applied through cable 44.

The lever 49 is pivotally mounted at one end 61 to the bottom of housing 50 whereby the spring 52 urging the rod 48 leftwardly acts through the pin and slot connection 62 at the other end of lever 49 to urge the lever leftwardly. The leftward movement of lever 49 is limited by the position of a cam 63 which engages a roller 64 secured to the lever 49. When the cam 63 changes its position it will either enable the lever 49 to move leftwardly, in which case the horizontal cross member 88 will be moved clockwise, or else it will cause the lever 49 to be moved rightwardly, in which case the spring 42 will be allowed to rotate the sheave 43, and thus the horizontal cross member 88, counter-clockwise.

Rotation of shaft 31 for the purpose of driving shaft 33 through gears 32 to change the angular position of blade 24 operates to rotate shaft 36 which carries a gear 66 disposed within housing 50. The gear 66 meshes with a gear 67 which is secured on one end of a shaft 68, the other end of which carries a worm gear 69 which engages a gear 71. Gear 71 is mounted on a shaft 72 which is rotatively secured in a vertical position within housing 50. Shaft 72 carries a gear 73 which meshes with a cam gear 74 which is secured to cam 63. Thus, rotation of shafts 31 results in rotation of shaft 72 which in turn rotates gear 74 causing a change in the position of cam 63. By an appropriate choice of gear ratios between shaft 31 and cam 63 and by a properly selected cam shape, it is possible to insure that the horizontal cross member 88 rotates whenever blade 24 rotates, and in a manner which will maintain the horizontal member 88 in accurate angular correlation with the blade 24.

As will be described in the discussion which follows, the shape of cam 63 is actually designed to do more than merely maintain angular correlation between the blade 24 and the horizontal cross member 88.

Due to the fact that the drawbar 26 is capable of movement in a vertical plane it is essential that the blade slope simulator have a degree of freedom in a horizontal plane so that the ball 27 can rotate without damaging the simulator. As long as horizontal member 88 is oriented transversely to the drawbar 26 no problems occur when the drawbar moves in a vertical plane. The same is true even when the horizontal cross member 88 is at some angle less than 90 degrees to the transverse direction to the drawbar 26. When the horizontal member 88, however, approaches a position which would place it parallel with the drawbar 26 (e.g., within 10° of parallel relationships) the simulator becomes vulnerable to damage as a result of movement of the drawbar in a vertical plane. Thus, in order not to restrict the allowable working positions of blade 24, it is essential to provide means for preventing the horizontal cross member 88 from entering the area of possible simulator damage.

FIG. 2 illustrates cam 63 in the position which it assumes when the blade 24 is at 90° to the longitudinal axis of the motor grader 11. This position of the cam also results in the horizontal cross member 88 assuming a position 90° to the longitudinal axis of the motor grader. As the blade 24 is rotated away from the 90° position the cam 63 rotates in order to maintain correlation between the cross member 88 and the blade. In a counter-clockwise movement of blade 24 which gives rise to clockwise rotation of cam 63, continued rotation of the blade will result in lever 49 being urged rightwardly allowing sheave 43 to move counter-clockwise with cross member 88 moving therewith. When the blade 24 has moved 80° (10° short of being parallel with the longitudinal axis of the motor grader) the point 101 on the cam 63 will engage the roller 64 and thus the lever 49 will be urged to its maximum rightwardly position. It is to be noted that even if the cross member 88 reaches a position 10° short of being parallel with the longitudinal axis of the motor grader prior to point 101 of cam 63 engaging roller 64, the cross member will be prevented from further rotation due to a pin 111 secured on one of brackets 85 engaging a stop pin 112 secured to stationary member 93. When the drawbar 26 is parallel to the longitudinal axis of the motor grader the pin 111 will engage the pin 112 just as the point 101 engages the roller 64. Continued rotation of the blade 24 in the same direction so as to approach parallelism with the motor grader longitudinal axis will result in rotation of cam 63 from point 101 to point 102. As the section of cam 63 between points 101 and 102 is traversed, the lever 49 is urged leftwardly resulting in a clockwise rotation of horizontal member 88. Point 102 on cam 63 will engage roller 64 when the blade 24 has been rotated approximately 10° past the parallelism position. When point 102 of cam 63 engages roller 64 the clockwise rotation of horizontal member 88 will have progressed to a point wherein a pin 113 attached to the other bracket 85 will have engaged the stop pin 112. Continued rotation of the blade and cam 63 will result in counter-clockwise rotation of cross member 88 until the blade once again reaches a position in which it is oriented 90° with respect to the longitudinal axis of the motor grader in which case the member 88 will also be oriented 90° from the longitudinal axis of the motor grader. Having rotated through 180°, however, the blade 24 will be facing towards the rear of the machine instead of towards the front of the machine but is nonetheless accurately simulated by member 88 so far as its angular position is concerned. If the blade is again rotated in the same direction to bring it back to its initial position cam 63 will again be rotated one complete revolution inducing the cross member 88 to move in the manner described above.

From the foregoing description it can be seen that there is a dead band extending approximately 10° on either side of the position at which the horziontal member 88 would be parallel with the longitudinal axis of the motor grader. During the time that the blade 24 is rotated through that 20° dead band arc the horizontal member 88 is being rotated in an opposite direction so that when the blade emerges from the dead band area the horizontal member 88 is in perfect position to assume its angular correlation with the blade. Thus, while the horizontal member 88 is not capable of free or continuous rotation it in no way places a similar limitation on blade 24. In other words, the blade 24 is capable of free and continuous rotation with the blade simulator maintaining angular correlation at all times except for those positons of the blade which fall within the dead band. It follows that the precise arc length of the dead band is determined by the shape of cam 63 and will be determined for the particular machine and working tool for which the present invention is adapted. The suggested 20° dead band of the present invention has proven effective with motor graders of a particular class and is not to be construed as a limiting factor of the present invention.

We claim:
1. A correlating control system for maintaining angular correlation between an angularly adjustable earth working tool and an angularly adjustable tool position simulator comprising in combination;
    spring means operatively associated with the simulator urging the simulator in one angular position;
    a cable affixed at one of its ends to the simulator, said cable operative to provide a force counteracting the force of said spring means whereby the simulator is maintained angularly stable; and
    means affixed to the other end of said cable operative to vary the counteracting force available from said cable whereby the angular position of the simulator at which the force of said spring means and the force of said cable acting on the simulator are in equilibrium can be altered, said means operatively associated with the earth working tool and responsive to changes in angular position thereof to change the force available from said cable and thus the position of the simulator.

2. An angular correlation system for a motor grader blade controlled by an automatic blade control system having a blade position simulator which is angularly adjustable, comprising in combination;
    spring means operatively associated with the simulator providing a force urging the simulator in one angular direction;
    a cable affixed at one of its ends to the simulator and counteracting the force of said spring means and thus operative to hold the simulator in a selected angular position;
    a variable position member affixed to the other end of said cable, said member operative when moved in one direction to decrease the counteracting force of said cable and thus enable said spring means to rotate the simulator in one angular direction, said member operative when urged in the opposite direction to increase the counteracting force of said cable and thus rotate the simulator in an opposite angular direction against the force of said spring means; and means mechanically associating said member with the blade whereby the member is urged in an appropriate direction whenever the angle of the blade is changed.

3. The angular correlation system of claim 2 wherein said last named means comprises a gear driven cam disposed to engage said variable position member and vary the position thereof as a function of the angular position of said cam.

4. The angular correlation system of claim 3 wherein the surface of said cam which engages said variable position member to urge it to an extreme position in one direction is disposed approximately 20 angular degrees from the surface of said cam which urges said variable position member to an extreme position in the other direction.

5. In an angular correlation system for maintaining angular correlation between a continuously rotatable earth working blade and a non-continuously rotatable blade simulator, the combination comprising;

cam operated means operatively disposed to change the angular position of the simulator, including a cam which induces the following angular movement of the simulator when said cam rotates one complete revolution: the simulator initially rotates in one direction through an angle less than 90°; the simulator then rotates in the opposite direction through an angle greater than 90° and less than 180°; finally, the simulator rotates in the one direction until the initial position of the simulator is re-established; and means mechanically associated the earth working blade with said cam whereby the cam is rotated one complete revolution in response to 180° of angular rotation of the blade.

6. The angular correlation system of claim 5 further comprising;

stop means associated with the simulator and operative to prevent rotation of the simulator beyond pre-established limits in either direction.

7. A correlating control system for maintaining angular correlation between an angularly adjustable earth working tool and an angularly adjustable tool position simulator comprising in combination:

spring means operatively associated with the simulator urging the simulator in one angular direction;

simulator adjusting means affixed to the simulator and operative thereon to provide only a force counteracting the force of said spring means whereby the simulator is maintained angularly stable; and control means also operatively associated with said simulator adjusting means operative to vary the counteracting force available from the simulator adjusting means whereby the angular position of the simulator at which the force of said simulator adjusting means and the force of said spring means acting on the simulator are in equilibrium can be altered, said control means operatively associated with the earth working tool and responsive to changes in angular position thereof to change the force available from said simulator adjusting means and thus the position of the simulator.

References Cited

UNITED STATES PATENTS 2,961,783   11/1960   Bowen et al. _____ 37—156

ABRAHAM G. STONE, *Primary Examiner.*

R. L. HOLLISTER, *Assistant Examiner.*